March 11, 1930.  A. E. OSWALD  1,750,122
ELECTRIC MOTOR
Filed Sept. 12, 1925    4 Sheets-Sheet 1

Inventor:
Alfred E Oswald
by B C Stickney
Attorney

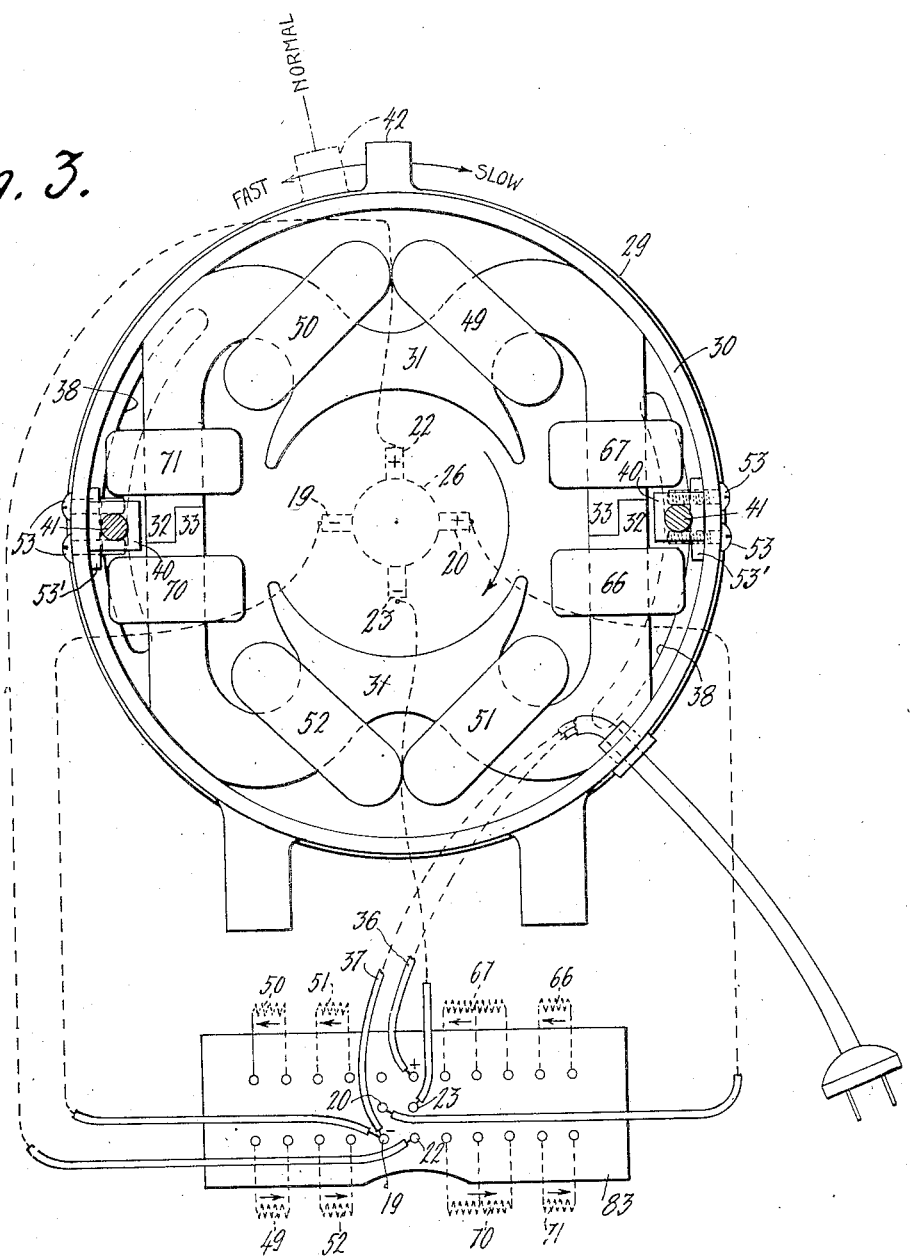

March 11, 1930.                A. E. OSWALD                 1,750,122
                                ELECTRIC MOTOR
                          Filed Sept. 12, 1925      4 Sheets-Sheet 3
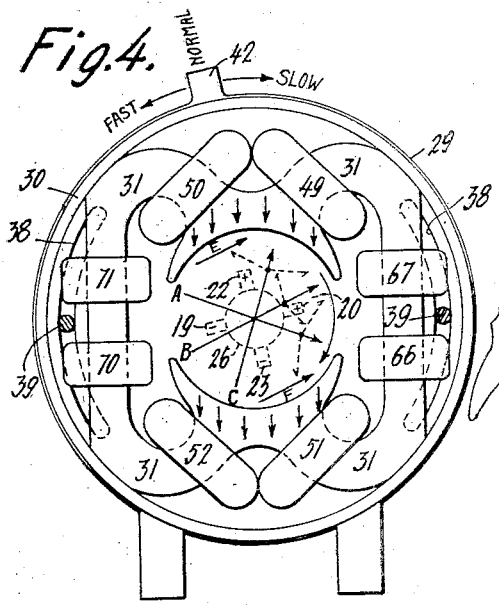
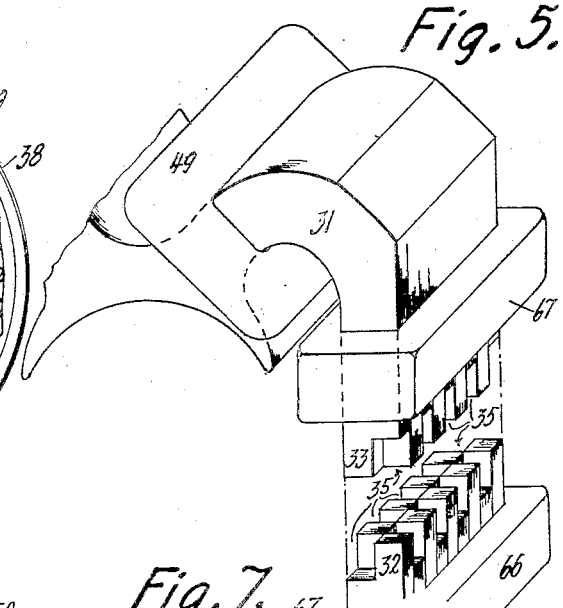
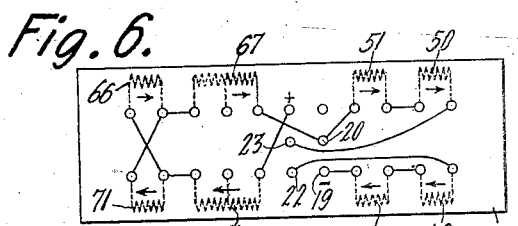
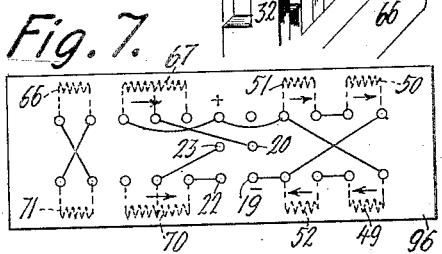
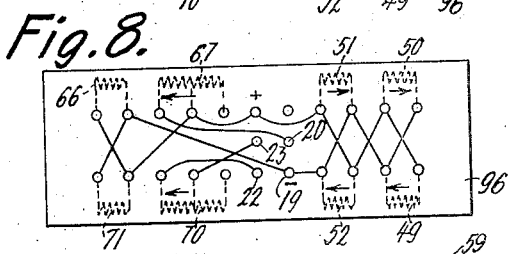
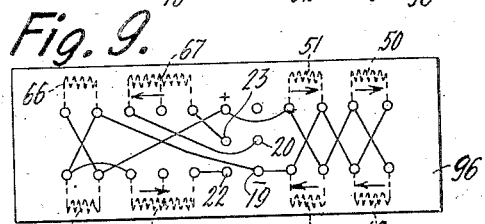
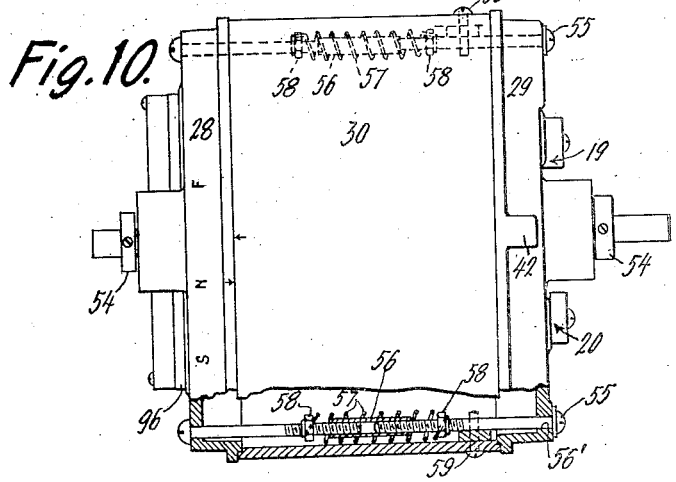
Inventor:
Alfred E Oswald
by B.B. Stickney
Attorney March 11, 1930.                A. E. OSWALD                1,750,122
ELECTRIC MOTOR
Filed Sept. 12, 1925    4 Sheets-Sheet 4

Inventor.
Alfred E Oswald
by D C Stickney
Attorney

Patented Mar. 11, 1930

1,750,122

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

ELECTRIC MOTOR

Application filed September 12, 1925. Serial No. 55,943.

This invention relates to electric motors and the primary object is to adapt a motor for work under a wide variety of conditions and on both direct and alternating current, thus substantially increasing its range of usefulness.

The motor has main and auxiliary field coils, each provided with terminals whereby connections are made in order that the motor may be adapted to a particular current, but an especially notable feature is that a main pair and an auxiliary pair of brushes are provided, each brush having a terminal. The coils and brushes are variously connectible by means of contact plates co-operating with the coil terminals and the brush terminals. The connectibility of the coils and brushes makes it possible for the motor to be used over a wide range and on currents of widely diversified nature.

The brushes are mounted for simultaneous movement for increasing or decreasing the speed of the motor, depending on the direction in which the brushes are moved. This gives the motor a two-fold advantage inasmuch as in operating a particular machine, it may be desired to change the speed of the motor, and further, because in the selling of motors, it makes it possible to meet a demand for motors of different speeds with a relatively small stock of motors, each motor possessing within itself an aptitude for operation at different speeds.

For operation on direct current, the coils are connected after the manner of a short shunt compound-wound motor, but with the important distinction that certain of the main field coils are connected to an auxiliary brush and a main brush. These latter coils receive a fraction of the armature voltage which is greatest across the main brushes. This scheme results in a greater range between high and low speed, because it is possible to weaken or strengthen the field magnet by this method of connection. When the brushes are moved in the direction opposite to that of armature rotation, the speed of the motor increases on a well known principle, but a new principle is also involved. As stated, certain of the field coils are connected to a main brush and an auxiliary brush. On the aforementioned shifting of the brushes, the voltage drop between the main brush and the auxiliary brush, to which the coils are connected, decreases, thus giving a weaker field and causing the motor to run faster.

The combination of the two principles for changing the speed of the motor, gives a particularly wide range of speed power and also eliminates sparking at the commutator and brushes.

On alternating current, the invention contemplates the selective use of coils in combination with the main and auxiliary brushes. More power is produced by the motor. The provision of auxiliary brushes prevents the armature from unduly limiting the amount of current used. The principle of putting current through the main brushes from the line circuit is still used, but the auxiliary brushes are also used to take off currents induced in the armature. By permitting the consumption of more current, the auxiliary brushes give the motor greater power. The shifting of the brushes in the direction of armature rotation, retards the motor both by reason of the old principle, that the shift of the main brushes effects such result, and also by reason of an additional principle; namely, that the voltage induced at the auxiliary brushes is altered by reason of the shift of the armature turns relatively to the lines of the field magnetic force. The relationship is such that as the speed increases, the power also increases. This is an advance in the art of alternating current motors.

Heretofore, brushes have been moved with the object, primarily, of elminating sparking. Where shifting of the brushes has been used to change speed, they have been moved by a rocker-arm, and not by a complete end-bearing or head, as in this invention.

Other features and advantages will hereinafter appear.

In the accompanying drawings,

Figure 3 is a cross-sectional view of the motor shown in Figure 1, the terminal plate being illustrated for clarity as outside the motor casing.

Figure 4 is a cross-sectional view of the motor shown in Figure 1, and illustrating by arrows the direction of field magnetic force, armature magnetism and armature rotation.

Figure 5 is a fragmentary perspective view of parts of the field magnet showing coils on a portion of the magnet and illustrating the manner of assembling of laminations.

Figure 6 is a plan view of a contact plate, having a system of connections thereon, for use when the motor is operated on direct current.

Figures 7, 8 and 9 are plan views of contact plates for use on alternating currents of 25, 60 and 100 cycles respectively.

Figure 10 is a plan view with parts broken away and parts in section of a modified form of device for securing a head for limited angular movement.

Figure 1:
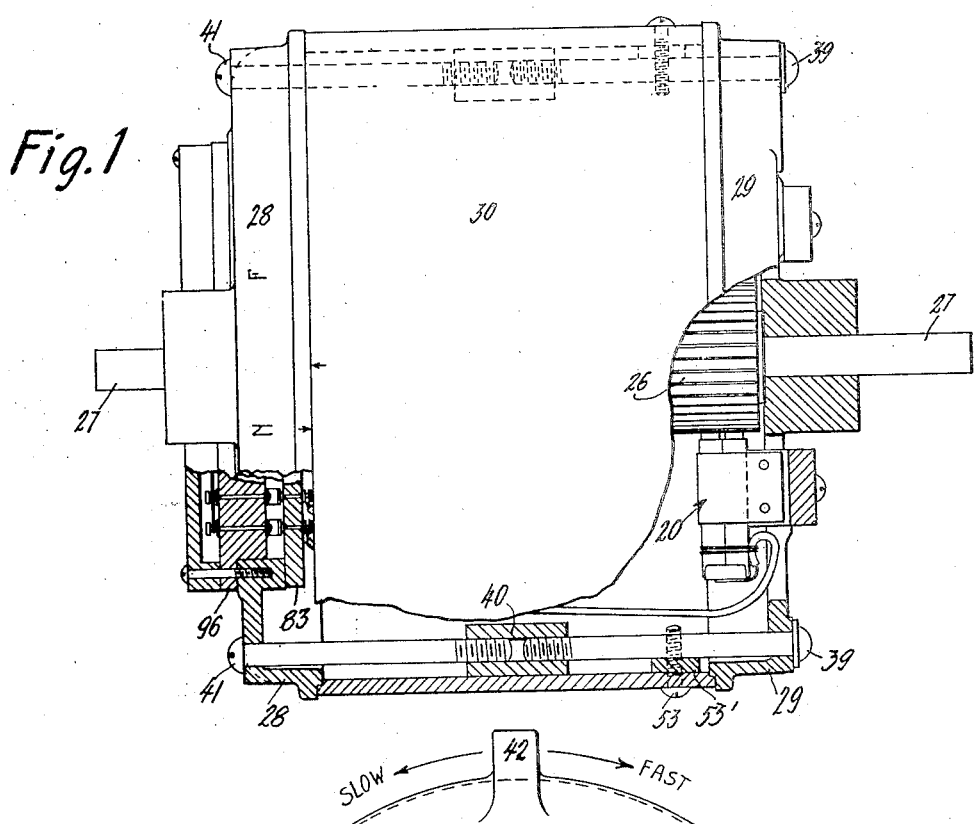
Figure 1 is a plan view with parts broken away and parts in section illustrating a motor embodying the invention.

The armature has a commutator 26 and a shaft 27 which rotates in heads or end closures 28 and 29 for a casing 30. The head 29 has a pair of main brushes 19 and 20 and a pair of auxiliary brushes 22 and 23, each of which is connected to terminals correspondingly designated on a terminal plate 83.

The field includes laminations 31 of U-shape and interchangeable. Extensions 32 and 33 are provided at the ends of the arms of each lamination and the arms of each lamination have recesses 35 to receive the extensions 32 and 33 of a lamination lying in the same plane so that the two laminations in a single plane interlock.

As shown in Figure 3 alternate layers of laminations are reversed so that an extension 32 on one lamination is adjacent but slightly offset from an extension 33 of an adjacent lamination in a different plane. The interlocking relation of the laminations is such that there can be no inaccuracy in the positioning thereof.

Main coils 49, 50, 51 and 52 and auxiliary coils 66, 67, 70 and 71 are mounted on the magnet and are connected to terminals on the terminal plate 83. The main conductors 36 and 37 are also connected to terminals on the terminal plate.

A contact plate 96 has contacts thereon for engaging the terminals on the terminal plate 83 and has conductors thereon connecting various contacts.

In Figures 6, 7, 8 and 9 various schemes of arrangement of connections are illustrated. These are merely illustrative of general principles as the coil terminals and brush terminals are connectible in a large variety of ways. The connections on the contact plates are made according to the nature of the current on which the motor is used.

The plates 96 and 83 are mounted on the head 28.

Means are provided by which the head 29 may be releasably secured to the head 28.

The head 29 may have slots 38 each of which may receive a screw 39. Each screw 39 may be threaded into a block 40 which may be secured to the head 28 by a screw 41. When the screw 41 is loosened the head 29 can be moved by the operator by means of a handle 42.

Figure 2:
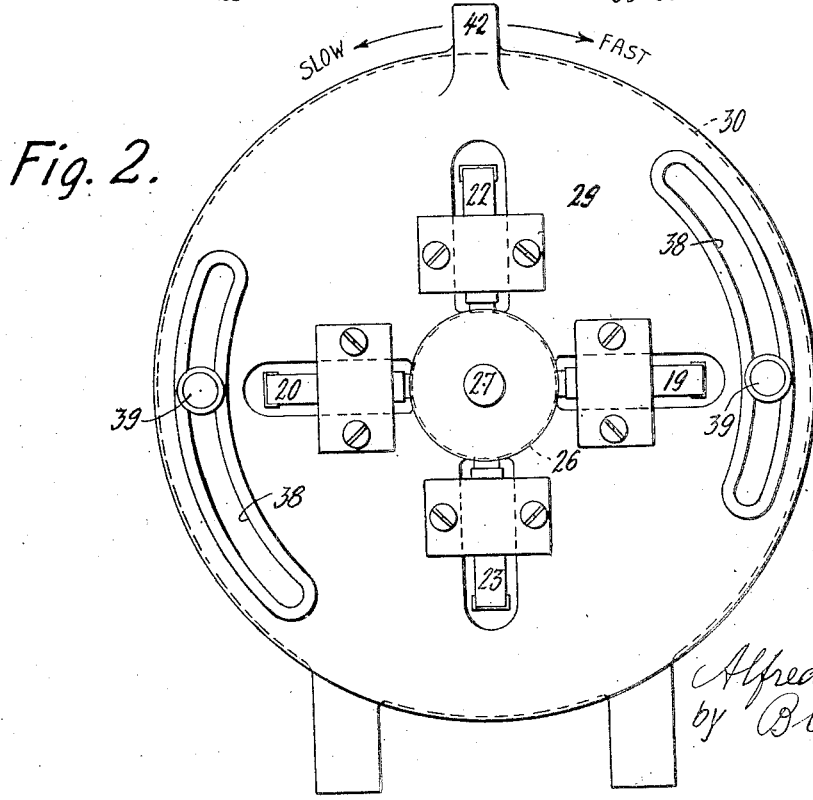
Figure 2 is an elevational view taken at the left end of the motor shown in Figure 1.

The movement of the head 29 shifts the brushes 19, 20, 22 and 23 and increases or decreases the speed of the motor depending on the direction of movement of the head as will be presently explained. As shown in Figures 1, 2 and 3 the casing 30 has appropriate markings to indicate whether the motor is in normal, fast or slow position.

Retaining screws 53 may be threaded into the block 53' for securing it to the side of the casing.

A modified form of retaining device for releasably securing the head 29 in a particular angular position is shown in Figure 10.

In this form the head 29 is movable longitudinally of the armature shaft a slight distance but the shaft is provided with stops 54 for preventing such large movement of the heads as would cause damage.

A screw 55 may be secured in a slot 56' in the head 29 and its threaded end may extend into a hollow connection 56. A similar oppositely disposed screw may be secured to the head 28. A spring 57 may be adjustably secured to the screws by means of nuts 58. The tension of the spring 57 may be overcome when the handle 42 on the head 29 is grasped by the operator and the head 29 may be readily moved angularly. Screws 59 may be extended through the wall of the casing for preventing displacement of the screw 55.

Although Figure 10 illustrates two of the devices, such as just described, for securing the head 29 for limited movement, any desired number of such devices may be used.

Figure 11:
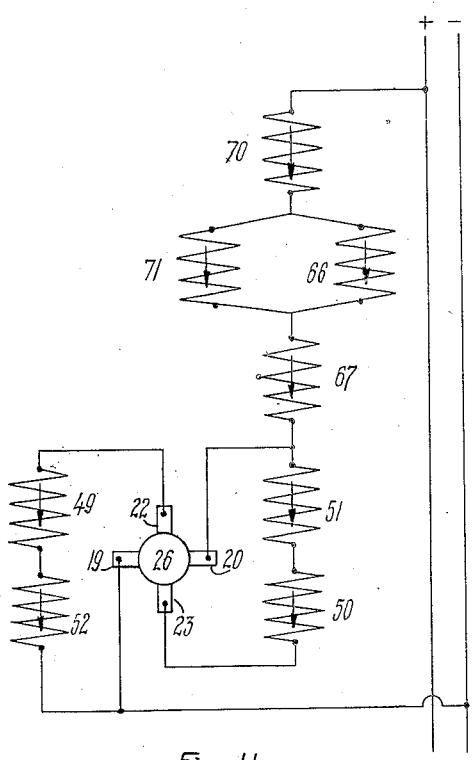
Figure 11 is a diagram of the motor for operating on direct current.

When the motor is connected as shown in Figures 6 and 11 the supply current first goes through the auxiliary coil 70, thence in series with the two auxiliary coils 66 and 71 connected in parallel, and then in series with the auxiliary coil 67, and finally in series with the armature brushes 20 and 19.

The main field coils are connected only in part across the armature, forming shunt field coils, so as to keep the motor from speeding away under no load. Main field coils 49 and 52 are connected across brushes 19 and 22 while main field coils 50 and 51 are connected across brushes 20 and 23. Full armature voltage is across brushes 19 and 20. Although brushes 22 and 23 are mechanically located midway between brushes 19 and 20, the voltage between brushes 22 and 19 or brushes 20 and 22 will not necessarily be half of the voltage across brushes 19 and 20 as is obvious. The voltage drop between a main brush and an auxiliary brush increases or decreases as they are moved in either one direction or the other. For instance, if they are moved towards the slow position, the voltage drop across brushes 19 and 22 and 20 and 23 increases because the armature windings cut more lines of force from the field. This produces greater field magnetism as the coils 49 and 52 and 50 and 51 respectively are connected across those brushes. As will be understood, the motor runs slower with the stronger field. Likewise, when the brushes are moved towards the fast position, the voltage drop across the brushes 19 and 22 and 20 and 23 decreases, thus producing a weaker field, and consequently the motor runs faster. This principle of speed control works in the motor embodying the invention in conjunction with a well known principle which is exhibited in a direct current motor having only two brushes, namely, that shifting the brushes in the direction of armature rotation decreases the speed of the motor and vice versa. The latter principle does not give such a wide range in speed and power without sparking at the commutator as the combined principles of speed control on which the motor embodying the invention operates.

The contact plate illustrated in Figure 7 is used for operation on an A. C. circuit of 25 cycles. The main field coils 50 and 51 are connected (see also Figure 12) in series and then directly across the supply line, likewise the other two main field coils 49 and 52. Part of the auxiliary coil 67 is connected in series with the main armature brushes 20 and 19, in this case producing magnetism in the same direction as do the shunt field coils, as will be noted by referring to the arrows. Part of auxiliary coil 70 is connected to brushes 22 and 23. This brings in a repulsion motor principle whereby the induced current in the armature from the field and the induced current in part of the auxiliary coil also from the field are connected together so as to produce more power and no sparking at the commutator.

The auxiliary coils 66 and 71 are connected in parallel but not to any source of supply and therefore no current will pass through them unless the magnetic strength of each side of the laminated field core is not equal.

Figure 13:
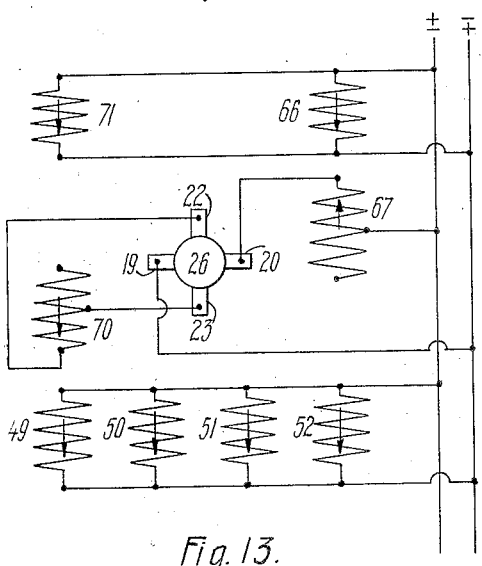
Figure 13 is a diagram of the motor for operating on alternating current.

Figure 8 shows the contact plate connections that enable the motor to be operated from 60 cycles. In general this is somewhat similar to the 25 cycle scheme, except the manner in which the coils are connected relatively to each other. As best seen in Figure 13 all four field coils 49, 50, 51 and 52 are connected in parallel and directly across the supply line. The two auxiliary coils 66 and 71 are likewise connected in parallel and directly across the supply line. Only part of the auxiliary coil 67 is connected in series with the armature, and this combination is connected directly across the supply line. It is pointed out here that the auxiliary coil 67 is connected in series with the armature in a reverse manner than was done for 25 cycles, so that the voltage induced in this auxiliary coil will be added to the supply voltage and thereby increase the voltage across the main brushes 19 and 20.

On A. C. more power is produced from the armature because current is forced through it in two ways. The first principle of putting current through brushes 19 and 20 from the line circuit is used but as the armature winding remains fixed enough current cannot be produced in this manner so a separate circuit is availed of. Currents induced in the armature, the auxiliary coils connected to the brushes 22 and 23, or a combination of both are used.

Figure 12:
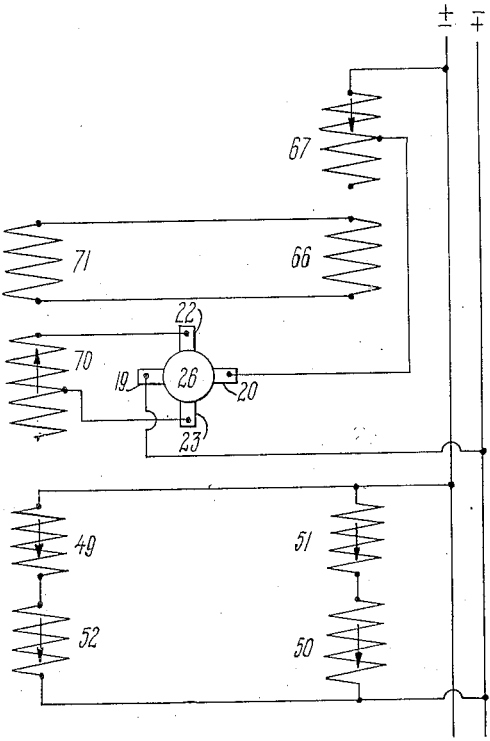
Figure 12 is a diagram of the motor for operating on alternating current of twenty-five cycles.

Referring to Figures 7 and 12, the auxiliary coil 70 is connected to the armature brushes 22 and 23 in such a manner that a current will flow through the armature windings between brushes 22 and 23, suitable to give the desired resultant magnetic force. As stated this coil may be connected reversely as is done in the scheme of Figure 13 for 60 cycles. In other words, these coils are connected with the best arrangement to control the speed and power, taking into consideration the frequency upon which the motor is to be used.

For an A. C. motor, comparing Figures 12 and 13, where Figure 12 is for 25 cycles and Figure 13 is for 60, it will be noted that for 25 cycles the auxiliary coil 67, which is connected in series with the main brushes 19 and 20, with the current passing through coil 67, increases the field magnetism while the same coil 67 for 60 cycles, Figure 13, is connected reversely so that coil 67 will act as a transformer and the low voltage generated by this coil 67, being in series with the line voltage, will naturally increase the voltage drop across brushes 19 and 20, above that of the main line voltage. This is done so that the inductance of the armature winding, the winding being the same for all currents, is overcome by a higher voltage so as to obtain the desired current and magnetic effect in the armature.

The speed of the motor changes on A. C. due to the well known principle that if the brushes are moved against the direction of rotation, the speed of the motor will increase. In addition to this, the power also increases due to the fact that the relationship with the armature windings and connections to the field, allows the motor to take more current, the power increasing directly as the current increases.

In Figure 4 arrows A, B and C indicate the direction of the armature magnetism. Arrow A indicates the direction of the armature magnetism as produced by the current used from the main line circuit. Arrow C indicates the magnetic field of the armature as produced by the induced current in the armature winding by the field magnetism. Arrow B represents the resultant magnetism from the combined magnetic force as shown by arrows A and C. It has been indicated or shown by dotted lines just how far these arrows will move in comparison with the movement of the brushes. The arrow B will not bisect the angle between arrows A and C unless the magnetic strength of arrows A and C is equal.

With the scheme of connections illustrated in Figure 12 the motor will operate with greater power and speed when the arrow B is a short distance in a counterclockwise direction from the position illustrated. This follows from the relation of the lines of field magnetic force to the force represented by the arrow B.

If brushes 22 and 23 were removed the force represented by arrows A and B would disappear and the motor would have less power.

When the strength of magnetism represented by arrow B is decreased arrow C is moved in a clockwise direction as it represents a resultant. The speed of the motor is therefore decreased.

When the minimum current is induced in the armature it so happens that the brushes are adjusted for the higher speed and likewise, when the minimum current is induced in the armature and is picked up by brushes 22 and 23, the brushes are in the position as indicated, for the slowest speed.

On A. C. the shifting of the brushes increases or decreases the speed in the standard method as previously explained. But also due to the fact that the vertical brushes 22 and 23 are connected to auxiliary coils in a novel way, the motor has more power when adjusted to a higher speed, due to the fact that the motor is capable of consuming more current under such conditions, because of the relationship of the resultant armature magnetism and field magnetism. One of the principles of operation is the fact that the shifting of the armature brushes allows more or less turns of the armature winding to be caught by the field magnetic force, causing the voltage generated in such armature winding to be decreased or increased. The auxiliary brushes are connectible to auxiliary coil 70, as explained, to help or oppose the main field magnetism. The scheme of shifting the brushes is for increasing speed, and allows the motor when connected to A. C. to consume more current, and thereby allows the motor to produce more power as the speed is increased. This is the result of the arrangement and relationship of the various coils and magnetism.

Figure 14:
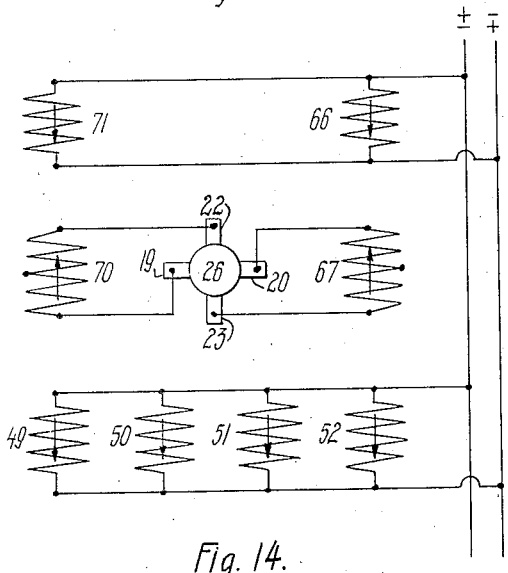
Figure 14 is a diagram of the motor for operating on one-hundred cycles.

With the contact plates shown in Figure 9 the motor can be used for the high frequency of 100 cycles. As best shown in Figure 14, which more clearly diagrams the connections of Figure 9, the four main field coils 49 and 50 and 51 and 52 and likewise the two auxiliary coils 66 and 71 are connected all in parallel and directly across the line. The armature does not receive any of its current whatsoever from the supply line, all current through it being induced as the result of the field magnetism. Not all of the armature winding is in use, as the auxiliary coil 67 is connected to brushes 20 and 23 and auxiliary coil 70 is connected to brushes 19 and 22. The current as generated by the auxiliary coils 67 and 70 produces a magnetic field in the armature, as indicated by arrows E and F shown in Figure 4. When the motor is operated on 100 cycles, the operation is similar to that of a repulsion motor, but with this combination the motor will not speed away, as does a straight repulsion motor. The motor is still adjustable for speed and power under this scheme in accordance with principles previously explained.

With the schemes illustrated in Figures 12 and 13, the R. P. M. of the motor goes down as the frequency goes down, while for a scheme as covered by Figure 14 the R. P. M. of the motor goes down as the frequency goes up.

Wide variations may be made within the scope of the invention, as for example, the field coils may be transposed with the auxiliary coils, and the invention may be used with other magnets than the double horseshoe type illustrated; and portions of the improvements may be used without others, as, for example, the motor altering devices or contact plates may be used only for alternating current if desired. As another example, the speed-regulating means for an alternating motor may be employed whether or not any contact plate is used.

Having thus described my invention, I claim:

1. An electric motor having an armature, a commutator, a main pair of brushes, an auxiliary brush, all of said brushes being mounted for shiftable movement, a field, means for moving said brushes simultaneously, thus altering the electromotive force at said auxiliary brush by reason of the change of relation of said armature and said field, and means connected to and co-operating with said auxiliary brush and operative by reason of the change of potential thereof to change the speed of said motor.

2. An electric motor having an armature, a commutator, a main pair of brushes, an auxiliary pair of brushes, all of said brushes being mounted for angular movement, each brush of each of said pairs being interposed between the brushes of the other pair, a field including coils, means for transmitting current from an auxiliary brush through one of said coils, and means for moving all of said brushes simultaneously, thus increasing or decreasing the electromotive force at one of said auxiliary brushes and thereby retarding or speeding up the motor.

3. An electric motor having an armature, a commutator, a main pair of brushes, an auxiliary pair of brushes, all of said brushes being mounted for angular movement, a brush of each of said pairs being interposed between the brushes of the other pair, a field including a coil, the coil being connected to one of said main brushes and an auxiliary brush, and means for shifting all of said brushes, and increasing or decreasing the number of lines of force between the brushes to which said coil is connected, thus producing a greater or lesser current in said coil, and increasing or decreasing, respectively, the speed of said motor.

4. A motor wound for alternating current, and having a field magnet, a plurality of field coils connectible across the mains in either series or parallel relation, a plurality of auxiliary coils, an armature, a commutator, a plurality of pairs of brushes mounted for shiftable movement, and means for moving said brushes simultaneously, and means connecting said main coils to said auxiliary coils and said brushes, and said auxiliary coils to said brushes, said coils co-operating on the movement of said brushes, to increase or decrease the speed of the motor.

5. An electric motor wound for alternating current and having a field magnet, a plurality of main field coils, and a plurality of auxiliary coils, all of said coils being connected across the mains in parallel relation, an armature, a commutator, a pair of main brushes and a pair of auxiliary brushes, a brush of each pair being interposed between brushes of the other pair, and a pair of additional auxiliary coils, each connected to a different main brush and auxiliary brush for operation by repulsion.

6. An electric motor including a bipolar field-magnet, an armature, a commutator, a pair of main brushes engaging the commutator at diametrically opposite sides for sending current through the armature, a pair of auxiliary brushes engaging said commutator at diametrically opposite sides but at points between the main brushes for taking off current flowing in said armature, a field-winding on said magnet connected to an auxiliary brush and a main brush, a second field-winding on said magnet connected to the other auxiliary brush and the other main brush, said main brushes thus co-operating with the auxiliary brushes in taking off current and exciting the field-windings therewith, and means for shifting the position of all of said brushes relative to the field-magnet, thereby to vary the electromotive force between an auxiliary brush and main brush and in consequence vary the speed of the motor.

7. An electric motor, for use on direct current and alternating currents of different frequencies, having an armature, a commutator, a bipolar field-magnet having diametrically opposite pole-members, two yokes joined by coil-receiving necks to said pole-members to form an annular magnet, four main field-coils, one on each neck adjacent a pole-member, four auxiliary field-coils, two on each yoke disposed between the two main field-coils, a pair of main brushes at diametrically opposite sides of said commutator, a pair of auxiliary brushes also at diametrically opposite sides of said commutator between the main brushes, and electric connections whereby said brushes and coils are brought into a predetermined co-operative relation for operating said motor at a certain speed and power on a certain kind of current, said auxiliary brushes, in said relation, co-operating to supply current induced or flowing in said armature to a certain portion of said field-coils.

8. An electric motor, as set forth in the invention of claim 7, having means for shifting the position of all of the brushes relative to the field-magnet to thereby vary the electromotive force at the main and auxiliary brushes to vary the speed and power of the motor afforded by the aforesaid predetermined co-operative relation of the brushes and coils.

9. In an electric motor, an armature, a commutator, a field-magnet, including two diametrically opposite poles of opposite signs and a plurality of field-exciting coils, a plurality of pairs of brushes, including a pair of diametrically opposite main brushes and a pair of diametrically opposite auxiliary brushes, a brush of each pair between the brushes of the other pair, the pairs being in a fixed relation to each other but in a predetermined position relative to the lines of force from the diametrically opposite poles, terminals connected severally to said coils and to the main and auxiliary brushes and to the line, and means interconnecting said terminals to form a predetermined motor-adapting system corresponding to the character of the line current and the desired speed and power of the motor.

10. An electric motor for use on direct current and alternating currents of different frequencies, having an armature, a bipolar field-magnet having diametrically opposite pole-members joined by yokes to form an annular magnet, main field-coils on each yoke adjacent said pole-members, auxiliary field-coils on each yoke disposed between the main field-coils, a commutator, a pair of main brushes at diametrically opposite sides of said commutator, a pair of auxiliary brushes also at diametrically opposite sides of said commuator between the main brushes, electrical connections whereby said brushes and coils are brought into a predetermined co-operative relation for operating said motor at a certain speed and power on a certain kind of current, said auxiliary brushes, in said relation, co-operating to supply current induced or flowing in said armature to a certain portion of said field-coils, and means for shifting the field-magnet position relative to all of said brushes to thereby vary the electromotive force at the main and auxiliary brushes to vary the speed and power of the motor afforded by the aforesaid predetermined co-operative relation of the brushes and coils.

ALFRED E. OSWALD.